(12) United States Patent
Longanbach (10) Patent No.: US 11,230,334 B2
(45) Date of Patent: Jan. 25, 2022

(54) MASTER LINK FOR A TRACK CHAIN (71) Applicant: Caterpillar Inc., Deerfield, IL (US)

(72) Inventor: David Longanbach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 370 days.

(21) Appl. No.: 16/422,581

(22) Filed: May 24, 2019

(65) Prior Publication Data

US 2020/0369332 A1    Nov. 26, 2020

(51) Int. Cl.
*B62D 55/21*    (2006.01)
*B62D 55/06*    (2006.01)
*B62D 55/28*    (2006.01)

(52) U.S. Cl.
CPC .......... *B62D 55/213* (2013.01); *B62D 55/06* (2013.01); *B62D 55/28* (2013.01)

(58) Field of Classification Search
CPC .... B62D 55/213; B62D 55/20; B62D 55/205; B62D 55/28; B62D 55/06
See application file for complete search history.

(56) References Cited

U.S. PATENT DOCUMENTS

| | | | |
|---|---|---|---|
| 6,783,196 B2 | 8/2004 | Maguire et al. | |
| 7,877,977 B2 | 2/2011 | Johannsen et al. | |
| 8,905,493 B2 | 12/2014 | Liu | |
| 8,915,556 B2 | 12/2014 | Wodrich et al. | |
| 2018/0281880 A1* | 10/2018 | Trone | B62D 55/28 |
| 2019/0344840 A1* | 11/2019 | Magner | B62D 55/213 |
| 2019/0351959 A1* | 11/2019 | Trone | B62D 55/32 |
| 2019/0351960 A1* | 11/2019 | Trone | B62D 55/21 |
| 2020/0298920 A1* | 9/2020 | Akinlua | B62D 55/21 |

FOREIGN PATENT DOCUMENTS

| | | |
|---|---|---|
| JP | S4730335 | 12/1972 |
| JP | 2008018795 | 1/2008 |

* cited by examiner

*Primary Examiner* — Jason R Bellinger
(74) *Attorney, Agent, or Firm* — Harrity & Harrity LLP (57) ABSTRACT A master link for a track chain is disclosed. The master link may include a first portion that abuts a first face of the link, a second portion that abuts a second face of the link, a first bore located on a first end of the link, a second bore located on a second end of the link, and a material located between the first portion and the second portion and extending between the first bore and the second bore. The material may create a separation between the first portion and the second portion to facilitate placement of the first bore and the second bore around outer diameters of corresponding mating members of a track chain. The material may be removable to remove the separation from between the first portion and the second portion.

20 Claims, 6 Drawing Sheets

MASTER LINK FOR A TRACK CHAIN

TECHNICAL FIELD

The present disclosure relates generally to a master link and, more particularly, to a master link that includes a material between a first portion and a second portion of the master link to facilitate placement of bores of the master link around outer diameters of corresponding mating members of a track chain.

BACKGROUND

Master links are used in track chains to connect two ends of the track chain together to form a loop. For example, a master link includes a bore at one end of the master link to connect to a mating member on one end of the track chain and another bore at the other end of the master link to connect to a mating member on the other end of the track chain. The master link can be fabricated with open circular bores and a separation that extends between the bores so that the bores can be placed around outer diameters of corresponding mating members of the track chain. Fasteners are then driven vertically through a top face of the master link into a bottom portion of the master link to close the gap and secure the bores around the outer diameters of the corresponding mating members. Alternatively, rather than fastening or clamping the master link to close the gap and secure the bores around the outer diameters of the corresponding mating members, the master link can be pressed onto the mating members.

One example of a master link is disclosed in U.S. Pat. No. 7,877,977 that issued on Feb. 1, 2011 ("the '977 patent"). In particular, the '977 patent discloses a master link for a chain assembly, comprising: a body member having a first side, a second side positioned opposite the first side, a shoe surface configured to receive a track shoe, and a rail surface positioned opposite the shoe surface; first and second apertures extending through the body member from the first side to the second side; third and fourth apertures extending through the body member from the first side to the second side and located between the first and second apertures; a strut member dividing the third and fourth apertures; a first gap located in the body member and extending from the first aperture to the third aperture; a second gap located in the body member and extending from the fourth aperture to the second aperture; and a third gap located in the strut member and extending from the third aperture to the fourth aperture.

While the '977 patent may provide a master link comprising a first gap located in the body member and extending from the first aperture to the third aperture; a second gap located in the body member and extending from the fourth aperture to the second aperture; and a third gap located in the strut member and extending from the third aperture to the fourth aperture, the '977 patent does not disclose a master link that includes a material in a separation between a first section of the master link and a second section of the master link or that includes a separation that facilitates securing of the master link to a track chain without the use of fasteners to perform or facilitate the securing of the master link to the track chain.

The master link of the present disclosure provides one or more functions and/or uses that are different than what is set forth above in the art.

SUMMARY

The present disclosure is related to a link, comprising a first portion that abuts a first face of the link; a second portion that abuts a second face of the link; a first bore located on a first end of the link; a second bore located on a second end of the link; and a material located between the first portion and the second portion and extending between the first bore and the second bore, wherein the material creates a separation between the first portion and the second portion to facilitate placement of the first bore and the second bore around outer diameters of corresponding mating members of a track chain, wherein the material is removable to remove the separation between the first portion and the second portion.

The present disclosure is related to a master link, comprising: a first portion that abuts a first face of the master link; a second portion that abuts a second face of the master link; a first bore located on a first end of the master link; and a second bore located on a second end of the master link, wherein corresponding shapes of the first bore and the second bore facilitate securing of the first bore and the second bore to corresponding mating members of a track chain without use of a set of fasteners, wherein a separation is located between the first portion and the second portion and extends between the first bore and the second bore, wherein the separation is expandable to facilitate insertion of a material between the first portion and the second portion and to facilitate placement of the first bore and the second bore around the corresponding mating members.

The present disclosure is related to a method, comprising: forming, by one or more machines of a factory, a link for a track chain, wherein the link has a first surface and a second surface that abut a third surface and a fourth surface, wherein the link has a first bore and a second bore that extend through the third surface and the fourth surface, wherein the first bore is located at a first end of the link and the second bore is located at a second end of the link; forming, by the one or more machines of the factory and in association with forming the link, a separation in the link that extends from the first bore to the second bore, wherein the separation creates a first portion of the link that abuts the first surface and a second portion of the link that abuts the second surface, wherein a width of the separation facilitates securing of the first bore and the second bore to corresponding mating members of the track chain; applying, by the one or more machines of the factory and after forming the separation, a mechanical force to expand the separation to facilitate insertion of a material within the separation and between the first portion and the second portion, wherein the material is associated with maintaining expansion of the separation to facilitate placement of the first bore and the second bore around outer diameters of the corresponding mating members; inserting, by the one or more machines of the factory and after expanding the separation, the material between the first portion and the second portion; and releasing, by the one or more machines of the factory and after inserting the material, the link from application of the mechanical force that is expanding the separation.

DETAILED DESCRIPTION

This disclosure relates to a master link for a track chain. The master link has universal applicability to any machine utilizing such a master link. The term "machine" may refer to any machine that performs an operation associated with an industry such as, for example, mining, construction, farming, transportation, or any other industry. As some examples, the machine may be a cold planer, a feller buncher, a forest machine, a forwarder, a harvester, an excavator, an industrial loader, a knuckleboom loader, a material handler, a pipelayer, a road reclaimer, a compact track loader, a skidder, a telehandler, a tractor, a dozier, a tractor scraper, or other above ground equipment, or underground equipment. Moreover, one or more implements may be connected to the machine and/or a component driven from an engine of the machine.

Figure 1:
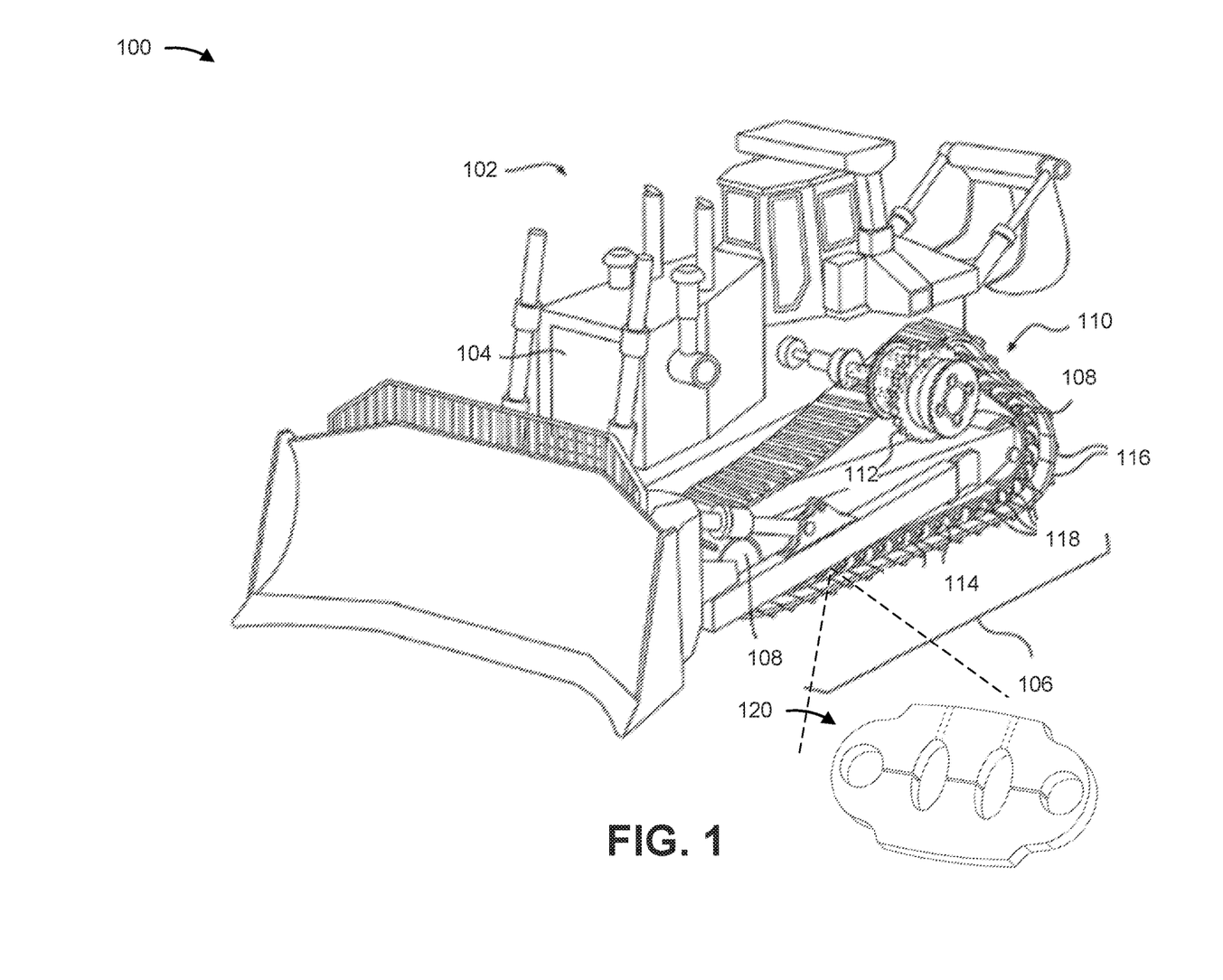
FIG. 1 is a diagram of an example machine that includes a master link for a track chain described herein.

FIG. 1 is a diagram 100 of an example machine that includes a master link for a track chain described herein. FIG. 1 shows a machine 102. For example, the machine 102 may be an earth moving machine such as an excavator, a dozier, a loader, or a similar machine. The machine 102 may include a power source 104 and an undercarriage assembly 106, which may be driven by the power source 104 and supported by one or more roller mechanisms 108.

The power source 104 may drive the undercarriage assembly 106 of the machine 102 at a range of output speeds and torques. The power source 104 may be a diesel engine, a gasoline engine, a gaseous fuel-powered engine, an electric engine, a hybrid engine, a power storage device, a fuel cell, and/or the like.

The undercarriage assembly 106 may include two separate continuous track chains 110, one on either side of machine 102 (although FIG. 1 only shows one of the two track chains 110). A track chain 110 may be driven by the power source 104 via one or more sprockets 112. In addition, the track chain 110 may include one or more rails 114 and multiple ground engaging plates 116 that engage a surface (e.g., the ground). For example, the track chain 110 may include multiple link subassemblies 118. A link subassembly 118 may include multiple portions of corresponding multiple rails 114 (e.g., two rails 114) with one or more links on each portion of a rail 114. As an example, a link subassembly 118 may include a first portion of a first rail 114, a second portion of a second rail 114, and a pair of links, with one link on each rail 114. The link subassembly 118 may also include a ground engaging plate 116 fastened to the pair of links. A full rail 114 may include multiple links and a master link 120 (e.g., arranged end-to-end, as described in more detail elsewhere herein) to connect ends of the rail 114 to form a loop. The master link 120 may connect two ends of a rail 114 of the track chain 110 (e.g., a track chain 110 may include two master links 120, one for each of the two rails 114 of the track chain 110). For example, the master link 120 may include corresponding bores at both ends of the master link 120 and a separation between two portions of the master link 120. Continuing with the previous example, FIG. 1 shows the master link 120 without a material in the separation to facilitate securing of the corresponding bores around outer diameters of corresponding mating members of the track chain 110 without use of fasteners to secure the master link 120 to the corresponding mating members. A mating member may include, for example, a pin, a rod, a cylinder, a bushing, a collar, and/or the like). A fastener may include, for example, a nut and bolt. The master link 120 is described in more detail elsewhere herein.

As indicated above, FIG. 1 is provided as an example. Other examples may differ from what is described in connection with FIG. 1.

Figure 2A:
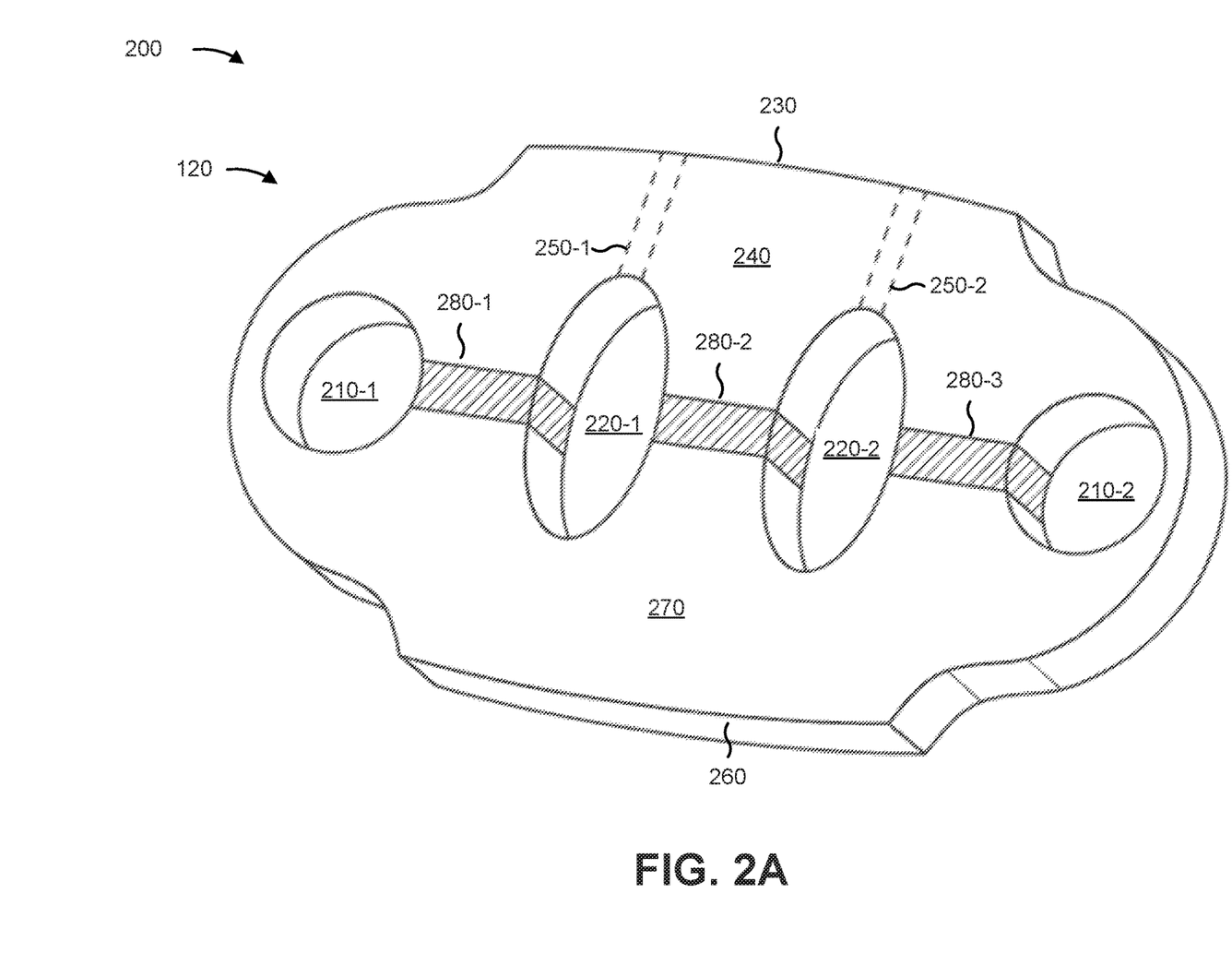
FIGS. 2A and 2B are diagrams of one or more example master links that may be used with the machine of FIG. 1.
Figure 2B:
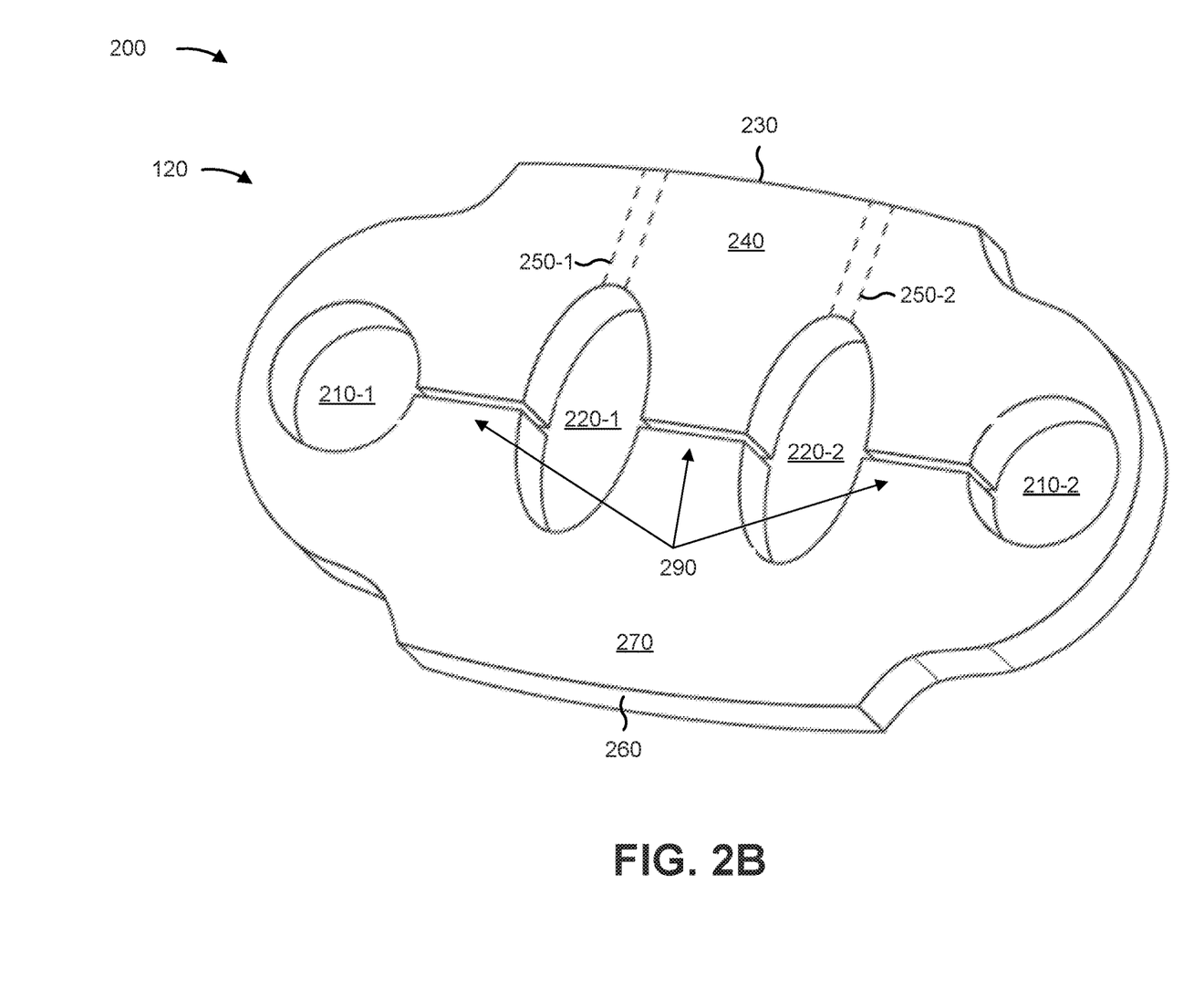

FIGS. 2A and 2B are diagrams 200 of one or more example master links that may be used with the machine of FIG. 1. FIG. 2A shows a side view of the master link 120. For example, FIG. 2A shows a side view of the master link 120 with a material in a separation between two portions of the master link 120. The master link 120 may comprise metal, a carbon alloy, plastic, and/or the like.

As shown in FIG. 2A, the master link 120 may include multiple bores 210-1 and/or 210-2 at corresponding ends of the master link 120. For example, the master link 120 may include a bore 210-1 at a first end of the master link 120 and a bore 210-2 at a second end of the master link 120. The bores 210-1 and/or 210-2 may be used to secure the master link 120 to the track chain 110. For example, the bores 210-1 and 210-2 may be placed around outer diameters of corresponding mating members of one or more link subassemblies 118. In some cases, the bores 210-1 and 210-2 may include surface preparation on corresponding radial surfaces of the bores 210-1 and 210-2 (e.g., on radial surfaces that are to contact outer diameters of corresponding mating members). For example, the surface preparation may include creating a rough surface, creating a pattern of structures, applying an adhesive, applying a thread locking fluid, and/or the like to increase an amount of friction between a radial surface of a bore 210-1 or 210-2 and an outer diameter of a mating member, such as to secure the master link 120 to the mating member, to increase a difficulty of removing the master link 120 from around outer diameters of the mating members, and/or the like. As further shown in FIG. 2A, the master link 120 may include bores 220-1 and/or 220-2 between the bores 210-1 and/or 210-2. The bores 220-1 and/or 220-2 may be included in the master link 120 for weight reduction purposes, to facilitate access to a fastener used to attach a ground engaging plate to a face of the master link 120, and/or the like.

As further shown in FIG. 2A, the master link 120 may include a face 230. For example, the face 230 may be a top face of the master link 120, may be a face to which a ground engaging plate is attached, and/or the like. The face 230 may abut a portion 240 of the master link 120. The portion 240 may be an upper portion of the master link 120.

As further shown in FIG. 2A, the portion 240 may include multiple holes (e.g., holes 250-1 and 250-2). Hole 250-1 or 250-2 may extend from the face 230 through the bottom of the portion 240 (e.g., into a corresponding bore 220), without extending into portion 270 (described below). A fastener (e.g., a bolt, a screw, and/or the like) may be inserted into the hole 250-1 or 250-2 on one side of the portion 240 to attach a ground engaging plate to the face 230. While the configuration of the holes 250-1 and/or 250-2 shown in and described with regard to FIGS. 2A and 2B may facilitate securing of a ground engaging plate to the master link 120, the holes 250-1 and/or 250-2 may not facilitate securing of the master link 120 to the track chain 110 based on the holes 250-1 and/or 250-2 not extending into the portion 270.

As further shown in FIG. 2A, the master link 120 may include a face 260. For example, the face 260 may be a bottom face of the master link 120, may be a face that contacts one or more roller mechanisms 108 and/or one or more sprockets 112 of undercarriage assembly 106, and/or the like The face 260 may abut a portion 270 of the master link 120. The portion 270 may be a lower portion of the master link 120.

The portion 240 and the portion 270 may be separated by a separation (e.g., a gap, a cut, and/or the like). For example, the separation may be formed during casting of the master link 120, may be formed after the casting of the master link 120, and/or the like. The master link 120 may include a material 280-1, 280-2, and/or 280-3 that creates and/or expands the separation between the portion 240 and the portion 270, as described in more detail below. The material 280-1, 280-2, and/or 280-3 may include a metal, a plastic, a ceramic, a carbon alloy, and/or the like and may be a different material than that of the master link 120. The material 280-1, 280-2, and/or 280-3 may be removable from the separation to remove the separation and/or to cause contraction of the separation. For example, the material 280-1, 280-2, and/or 280-3 may be removable via melting of the material 280-1, 280-2, and/or 280-3 (e.g., based on the material 280-1, 280-2, and/or 280-3 having a melting temperature between an expected environmental temperature of the master link 120 during storage, shipment, installation, and/or the like of the master link 120, and a melting temperature of the material of the master link 120).

As another example, the material 280-1, 280-2, and/or 280-3 may be removable via application of a mechanical force to the material. Continuing with the previous example, the material 280-1, 280-2, and/or 280-3 may be in a wedge shape or a block shape that can be removed via application of a mechanical force to the material 280-1, 280-2, and/or 280-3, may shatter upon application of a threshold mechanical force to the material 280-1, 280-2, and/or 280-3, and/or the like. Additionally, or alternatively, the material 280-1, 280-2, and/or 280-3 may be removed by cutting the material from the separation.

FIG. 2A shows a particular configuration of material 280-1, 280-2, and/or 280-3. For example, FIG. 2A shows various portions of the material 280-1, 280-2, and/or 280-3 (e.g., portions materials 280-1 through 280-3) located in the separation between the portion 240 and the portion 270. In this configuration, the portions of material 280-1, 280-2, and/or 280-3 expand the separation by applying mechanical force on the portion 240 and the portion 270. In doing so, the portions of the material 280-1, 280-2, and/or 280-3 cause the bores 210-1 and/or 210-2 to have a distorted circular shape based on expansion of the separation at corresponding intersects of the bores 210-1 and/or 210-2 (e.g., causing the bores 210-1 and/or 210-2 to have a C-like shape) Expansion of the separation, and of the bores 210, facilitates placement of the bores 210-1 and/or 210-2 around outer diameters of corresponding mating members of the track chain 110. In the configuration shown in FIG. 2A, material 280-1, 280-2, and/or 280-3 applies tension to the master link 120 to expand the bores 210-1 and/or 210-2 to facilitate placement of the bores 210-1 and/or 210-2 around outer diameters of corresponding mating members.

Other configurations of the material 280-1, 280-2, and/or 280-3 and/or the bores 220-1 and/or 220-2 are possible. For example, the master link 120 may include a single portion of the material 280-1, 280-2, and/or 280-3 that extends from the bore 210-1 to the bore 210-2. Additionally, or alternatively, the master link 120 may include a single portion of material 280-1, 280-2, and/or 280-3 between one of the protrusions formed by bores 210-1 and/or 210-2 and/or by bores 220-1 and/or 220-2 (e.g., the master link 120 may include a single portion of material 280-1, 280-2, and/or 280-3 between the protrusions between bores 220-1 and 220-2). Additionally, or alternatively, the master link 120 may include a different quantity of the bores 220-1 and/or 220-2 (e.g., one bore 220, three bores 220, four bores 220, etc.). In this case, the quantity of portions of the material 280-1, 280-2, and/or 280-3 may be adjusted as needed to cause expansion of the separation between the portion 240 and the portion 270 based on the quantity of bores 220-1 and/or 220-2 included in the master link 120.

FIG. 2B shows another side view of the master link 120. For example, FIG. 2B shows the master link 120 in a state prior to the material 280-1, 280-2, and/or 280-3 having been inserted in the separation between the portions 240 and 270 (e.g., after the master link 120 is formed) or after the material 280-1, 280-2, and/or 280-3 has been removed from the separation (e.g., after installation on the track chain 110).

As shown by reference number 290, the separation between portions 240 and 270 may have a narrower width than that shown in FIG. 2A based on the material 280-1, 280-2, and/or 280-3 not being present in the separation. For example, the width of the separation may facilitate securing of the bores 210-1 and/or 210-2 to the corresponding mating members of the track chain 110, without the use of fasteners to close the separation, after the master link 120 has been installed on the track chain 110. Continuing with the previous example, the master link 120 may be configured such that the portions 240 and 270 contract toward each other upon removal of the material 280-1, 280-2, and/or 280-3 from the separation to place the master link 120 in the state shown in FIG. 2A. In this state, the bores 210-1 and/or 210-2 may have a shape that matches that of outer diameters of the corresponding mating members of the track chain 110 (e.g., a circular shape) and/or dimensions to secure the bores 210-1 and/or 210-2 to the corresponding mating members. This facilitates securing of the master link 120 to the corresponding mating members without the use of fasteners through, for example, the face 230 and into the portion 270 to close the separation, thereby conserving material that would otherwise be used to manufacture the fasteners, reducing a weight of the master link 120 and/or a machine on which the master link 120 is installed, and/or the like. In the configuration shown in FIG. 2B, the lack of material 280-1, 280-2, and/or 280-3 (shown by reference number 290) causes 210 bores 210-1 and/or 210-2 be in a shape that facilitates compression of bores 210-1 and/or 210-2 around outer diameters of corresponding mating members, thereby securing the bores 210-1 and/or 210-2 to the outer diameters.

The separation between the portion 240 and the portion 270 may be expandable, as described elsewhere herein. For example, the separation may be expandable by a machine to facilitate insertion of the material 280-1, 280-2, and/or 280-3 into the separation (e.g., to form the configuration of the master link 120 shown in FIG. 2A), to facilitate removal of the master link 120 from the track chain 110, and/or the like.

As indicated above, FIGS. 2A and 2B are provided as one or more examples. Other examples may differ from what is described in connection with FIGS. 2A and 2B. In some implementations, rather than using one or more portions of material 280-1, 280-2, and/or 280-3 to expand the master link 120 to facilitate placement of bores 210-1 and/or 210-2 around outer diameters of corresponding mating members, the master link 120 may include corresponding fasteners that are driven through holes 250-1 and/or 250-2 to portion 270 to expand bores 210-1 and/or 210-2 and bores 220-1 and/or 220-2. In this case, after the bores 210-1 and/or 210-2 have been placed around outer diameters of corresponding mating members, the fasteners may be removed from holes 250-1 and/or 250-2 to allow contraction of the master link 120 to the form shown in FIG. 2B, thereby securing the master link 120 around the outer diameters of the mating members.

Figure 3:
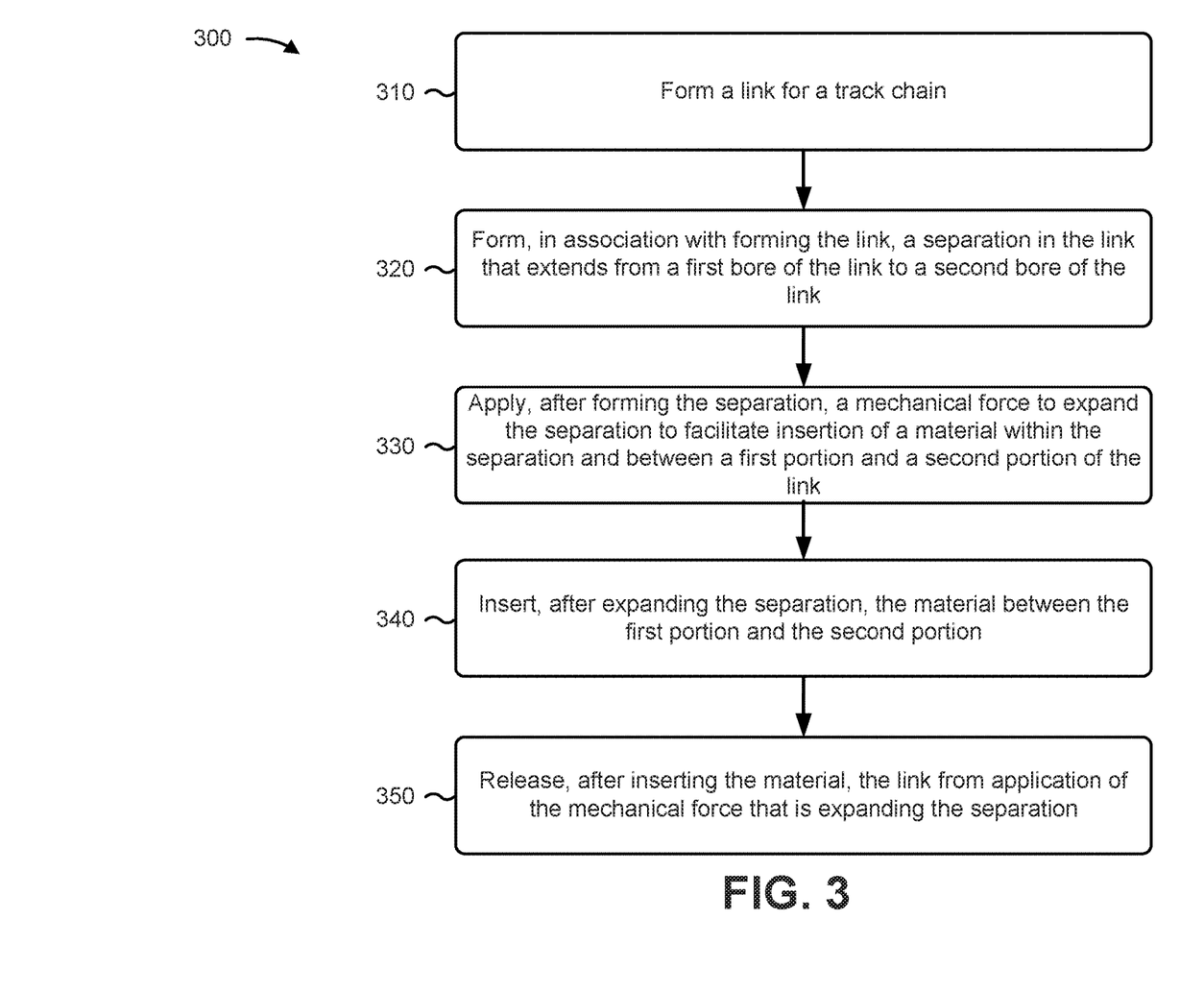
FIG. 3 is a flow chart of an example process related to manufacturing a master link for a track chain described herein.

FIG. 3 is a flow chart of an example process 300 for manufacturing a master link for a track chain. For example, FIG. 3 shows an example process 300 for manufacturing a master link 120 for a track chain 110, described above. Notably, while example process 300 is described in the context of a master link 120, the implementations described with respect to process 300 apply equally to other possible configurations of a master link 120.

As shown in FIG. 3, process 300 may include forming a link for a track chain (block 310). For example, one or more machines of a factory may form a master link 120 for a track chain 110. The one or more machines may be partially or totally controlled by a computing device (e.g., that includes a memory, a processor, and/or the like).

The one or more machines may be capable of cutting, casting, melting, and/or the like material to form the link, may be capable of machining bores (e.g., bores 210-1 and/or 210-2 and/or bores 220) into the link, and/or the like. For example, the one or more machines may form the link such that the link has a first surface (e.g., a face 230) and a second surface (e.g., a face 260) that are generally parallel to each other. The master link 120 may include a third surface and a fourth surface (e.g., a front surface shown in FIGS. 2A and 2B and a rear surface, respectively, of the master link 120) that the first surface and the second surface abut. The one or more machines may form the link such that the link has a first bore (e.g., a bore 210-1) and a second bore (e.g., a bore 210-2) that extend through the third surface and the fourth surface. The one or more machines may form the link such that the first bore is located at a first end of the link and the second bore is located at a second end of the link. The first bore and the second bore may have corresponding shapes that match corresponding mating members around which the first bore and the second bore are to be placed (e.g., the corresponding shapes may be a result of forming the link).

As further shown in FIG. 3, process 300 may include forming, in association with forming the link, a separation in the link that extends from a first bore of the link to a second bore of the link (block 320). For example, the one or more machines may form, in association with forming the master link 120, a separation in the link that extends from a bore 210-1 to a bore 210-2. The one or more machines may form the separation such that the separation creates a first portion of the link (e.g., a portion 240) that abuts the first surface and a second portion of the link (e.g., a portion 270) that abuts the second surface. A width of the separation may facilitate securing of the first bore and the second bore to corresponding mating members of a track chain.

The one or more machines may form the separation using one or more techniques. For example, the one or more machines may use electro-discharge machining (EDM), sawing, and/or the like to form the separation. Additionally, or alternatively, the one or more machines may form the separation during casting of the link. For example, a cast used to form the link may cause the separation to be included in the link.

The one or more machines may prepare a surface of the bores 210-1 and 210-2 on corresponding radial surfaces of the bores 210-1 and 210-2 (e.g., on radial surfaces that are to contact outer diameters of corresponding mating members). For example, the surface preparation may include creating a rough surface, creating a pattern of structures, applying an adhesive, applying a thread locking fluid, and/or the like to increase an amount of friction between a radial surface of a bore 210-1 or 210-2 and an outer diameter of a mating member, such as to secure the master link 120 to the mating member, to increase a difficulty of removing the master link 120 from around outer diameters of the mating members, and/or the like.

As further shown in FIG. 3, process 300 may include applying, after forming the separation, a mechanical force to expand the separation to facilitate insertion of a material within the separation and between a first portion and a second portion of the link (block 330). For example, the one or more machines may apply, after forming the separation, a mechanical force to expand the separation to facilitate insertion of a material (e.g., material 280) within the separation and between portion 240 and portion 270 of the master link 120. The material may be associated with maintaining expansion of the separation to facilitate placement of the first bore and the second bore around outer diameters of the corresponding mating members of the track chain.

The one or more machines may expand the separation to a width that facilitates placement of the first bore and the second bore around the outer diameters of the corresponding mating members of the track chain. For example, the one or more machines may expand the separation to a width that causes the first bore and the second bore to have a distorted circular shape that facilitates placement of the first bore and the second bore around the outer diameters of the corresponding mating members. The one or more machines may apply heat to the link to facilitate expansion of the separation.

As further shown in FIG. 3, process 300 may include inserting, after expanding the separation, the material between the first portion and the second portion (block 340). For example, the one or more machines may insert the material 280 between the portion 240 and the portion 270 after expanding the separation. The one or more machines may insert the material in a solid form or a quasi-solid form (e.g., in a heated, but not molten, malleable form). For example, the one or more machines may insert a wedge or a block of the material into the separation between the first portion and the second portion. Alternatively, the one or more machines may insert the material by flowing a molten form of the material into the separation between the first portion and the second portion. For example, the one or more machines may place one or more retainers around the separation to contain the molten material, and may flow the molten material into the one or more retainers after placing the one or more retainers around the separation.

The one or more machines may attach a ground engaging plate to the link in association with inserting the material between the first portion and the second portion. For example, the one or more machines may align the ground engaging plate with the first surface of the link and may attach the ground engaging plate to the first surface using one or more fasteners. As described above, the fasteners may be driven through the first portion and not into the second portion. In this way, the fasteners may not be used to close the separation and secure the link to a track chain.

As further shown in FIG. 3, process 300 may include releasing, after inserting the material, the link from application of the mechanical force that is expanding the separation (block 350). For example, the one or more machines may release, after inserting the material 280, the master link 120 from application of the mechanical force that is expanding the separation.

When the one or more machines insert molten material or quasi-solid material, the one or more machines may release the mechanical force after the molten material or the quasi-solid has cooled to below a particular temperature. For example, the one or more machines may cool the molten material to below the particular temperature (e.g., as determined by using one or more sensors). The particular temperature may be based on properties of the material to maintain expansion of the separation at different temperatures. Additionally, or alternatively, the one or more machines may use one or more sensors to monitor for a failure of the material to maintain expansion of the separation (e.g., after the material has cooled or when the material is inserted in a solid form). For example, the one or more machines may monitor a width of the separation, a shape (or dimensions) of the first bore and the second bore, and/or the like.

The one or more machines may package the link for shipment and/or storage. The one or more machines may load the link onto a vehicle (e.g., a truck, a train, a plane, a boat, and/or the like) for delivery to a destination. The one or more machines may send a set of instructions to the vehicle. For example, the set of instructions may identify the destination, may identify a scheduled delivery time for the link, may cause the vehicle to depart to the destination, and/or the like.

The one or more machines may install the link on a machine. For example, the one or more machines may install the link on a track chain of the machine. The one or more machines may install the link by placing the first bore and the second bore around outer diameters of corresponding mating members of a track chain, and may remove the material from between the first portion and the second portion. The one or more machines may remove the material by melting the material (e.g., where the material has a melting temperature that is less than a material of the link), by applying a mechanical force to the material perpendicular to the third surface and the fourth surface, and/or the like. The one or more machines may uninstall the link by cutting the link from the track chain, by expanding the separation to a width similar to that when the link was installed and removing the link from around the outer diameters of the corresponding mating members, and/or the like.

Although FIG. 3 shows example blocks of process 300, in some implementations, process 300 may include additional blocks, fewer blocks, different blocks, or differently arranged blocks than those depicted in FIG. 3. Two or more of the blocks of process 300 may be performed in parallel.

Figure 4A:
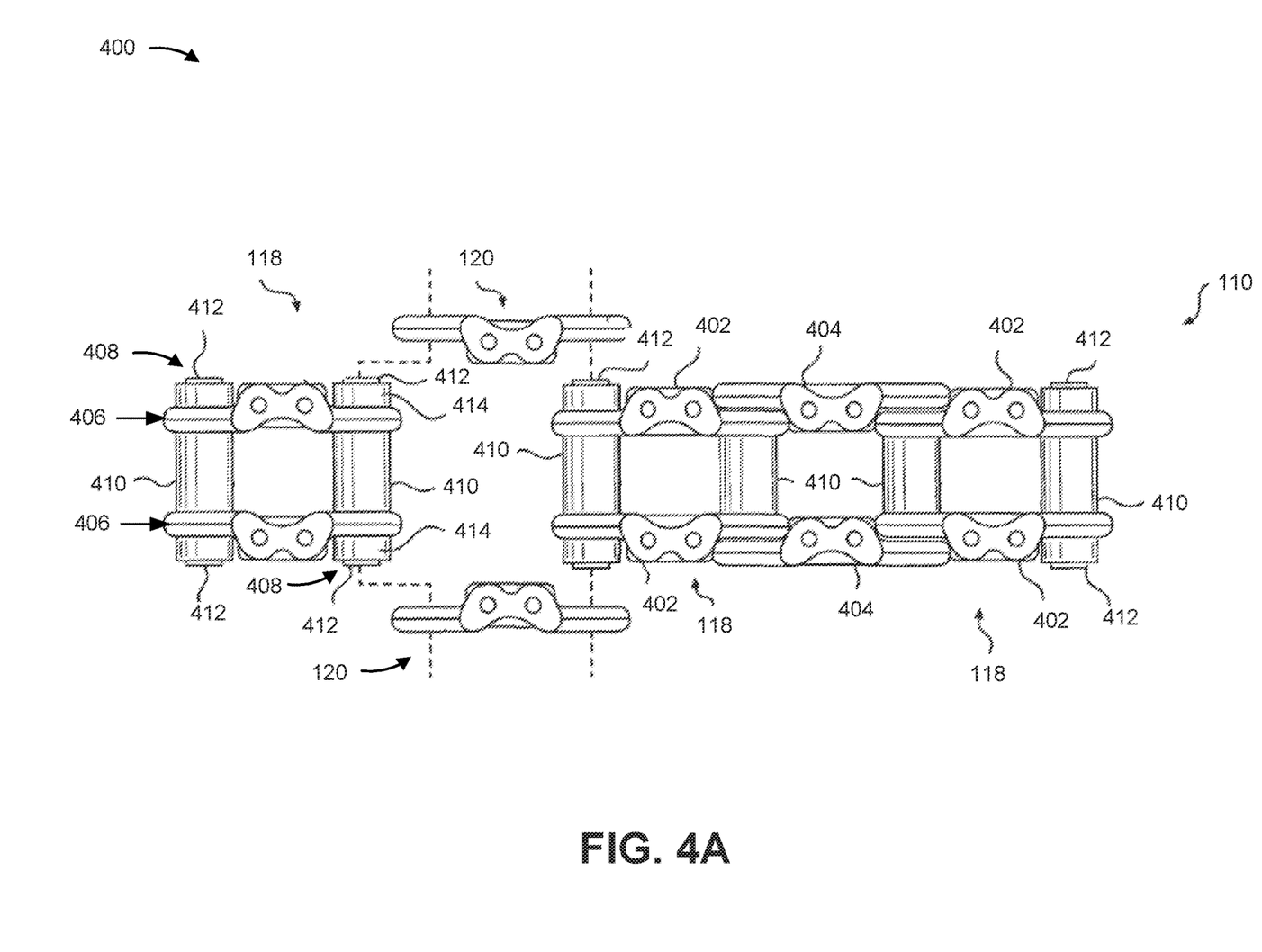
FIGS. 4A and 4B are diagrams illustrating a top-view and a side-view of an exemplary track chain 110, respectively.

FIGS. 4A and 4B are diagrams 400 illustrating a top-view and a side-view of an exemplary track chain 110, respectively. As shown in FIG. 4A, the track chain 110 may include various link subassemblies 118, which may include a pair of inner links 402 or a pair of outer links 404. The inner links 402 and the outer links 404 may include holes 250 similar to that described elsewhere herein to attach a ground engaging plate 116 to a link subassembly 118. As further shown in FIG. 4A, the track chain 110 may include a pair of master links 120, where a first master link 120, of the pair of master links 120, is included in a first rail 406 of the track chain 110 and a second master link 120, of the pair of master links 120, is included in a second rail 406 of the track chain 110. As further shown in FIG. 4A, a link subassembly 118 may include a pair of mating members 408 to connect links of different rails 406. A mating member 408 may include a substantially cylindrical bushing 410 disposed about a substantially cylindrical pin 412. A mating member 408 may include a pair of bearings (not shown) that are freely rotatable relative to pin 412 and may include a pair of collars 414 that are fixed relative to pin 412. A collar 414 may be disposed at an end of pin 412, a bushing 410 may be disposed substantially in the middle of pin 412, and a bearing may be disposed between a collar 414 and a bushing 410.

Figure 4B:
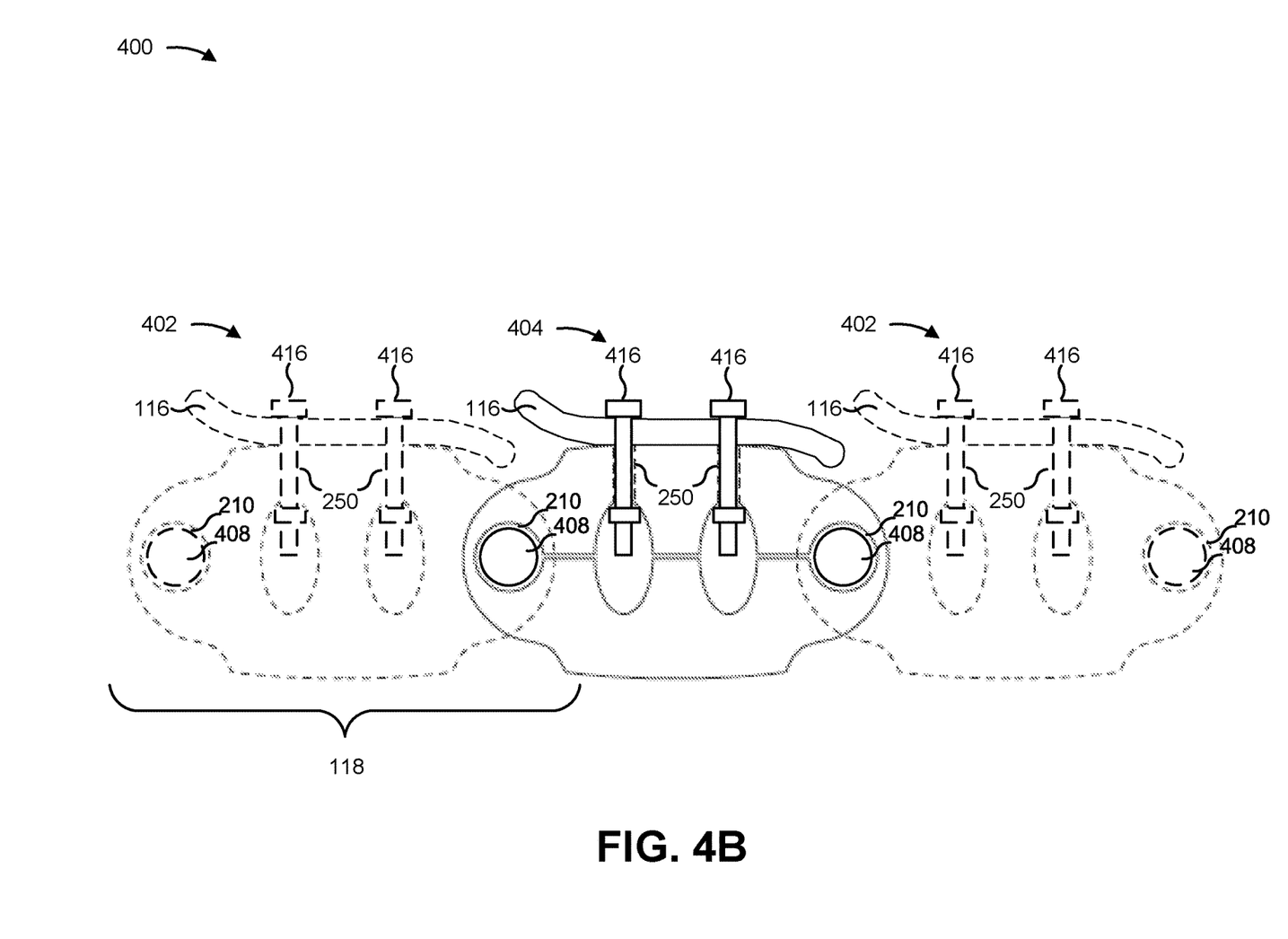

Turning to FIG. 4B, an inner link 402 may include bores 210 configured to receive a first mating member 408 and a second mating member 408. An outer link 404 may be disposed in a substantially similar orientation as an inner link 402, and may be configured to similarly receive opposing ends of the second mating member 408 and a third mating member 408. A mating member 408 may interface with a bore 210 of an inner link 402 and an outer link 404 such that consecutively connected link subassemblies 118 may be pivotally interconnected to one another to form track chain 110. For example, an inner link 402 may be configured to engage the bearings via the bores 210 and pivot with respect to pin 412 (reference number not shown in FIG. 4B) and an outer link 404 may be configured to engage collars 414 (reference number not shown in FIG. 4B) via corresponding bores 210 of the outer link 404. As such, adjacent link subassemblies 118 may be configured to pivot with respect to one another to form an articulating track chain 110. Similarly, a master link 120 (e.g., outer link 404 in FIG. 4B) may be interconnected between two link subassemblies 118 to connect two ends of a rail 406 of track chain 110.

A corresponding ground engaging plate 116 may be connected to link subassemblies 118. A ground engaging plate 116 may include a base portion, a ground-engaging surface, a leading edge, and a trailing edge. A ground engaging plate 116 may additionally include opposing side edges (only one of which shown in FIG. 4B for the ground engaging plates 116) disposed between the leading edge and the trailing edge. Additionally, a ground engaging plate 116 may include one or more holes 250 for corresponding fasteners 416 to secure a ground engaging plate 116 to a link subassembly 118. A ground engaging plate 116 may connect to a pair of opposing inner links 402 or to a pair of opposing outer links 404.

As indicated above, FIGS. 4A and 4B are provided as one or more examples. Other examples may differ from what is described in connection with FIGS. 4A and 4B.

INDUSTRIAL APPLICABILITY

The disclosed master link (e.g., a master link 120) may be used with any machine where such a master link is needed. The master link may be configured with a separation between two portions of the master link (e.g., portions 240 and 270). The separation may include a material (e.g., material 280-1, 280-2, and/or 280-3) between the two portions. A width of the separation with the material may facilitate placement of bores of the master link (e.g., bores 210-1 and/or 210-2) around outer diameters of corresponding mating members of a track chain (e.g., a track chain 110). Conversely, a width of the separation without the material may facilitate securing of the bores of the master link around the outer diameters of the corresponding mating members. The master link may be configured such that fasteners are not needed to close the separation to secure the master link to the mating members. This conserves material and costs that would otherwise be used to fabricate the fasteners (e.g., a threaded hole configured to receive a bolt) to close the separation. Furthermore, this conserves material and costs that would otherwise be needed to fabricate the master link to permit a fastener to be inserted (e.g., in a threaded hole configured to receive a bolt or another type of fastener). In addition, this reduces weight of the master link as installed on a track chain relative to a master link that needs fasteners (e.g., a long, heavy bolt) to close the separation. Conserving weight conserves fuel resources of a machine on which the master link is installed.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A link, comprising:
a first portion that abuts a first face of the link;
a second portion that abuts a second face of the link;
a first bore located on a first end of the link;
a second bore located on a second end of the link; and
a material located between the first portion and the second portion and extending between the first bore and the second bore,
wherein the material creates a separation between the first portion and the second portion to facilitate placement of the first bore and the second bore around outer diameters of corresponding mating members of a track chain,
wherein the material is removable to remove the separation from between the first portion and the second portion.

2. The link of claim 1, wherein the material is removable by melting of the material.

3. The link of claim 2, wherein the material has a melting temperature that is less than a material of the link.

4. The link of claim 1,
wherein the material is in a shape of a wedge,
wherein the material is removable by application of a mechanical force to the material.

5. The link of claim 1, wherein the first portion and the second portion are configured to contract toward each other to secure the first bore and the second bore around the outer diameters of the corresponding mating members after the material has been removed and without application of a mechanical force to the link.

6. The link of claim 1, wherein the first bore and the second bore have corresponding distorted circular shapes based on the material creating the separation,
wherein the corresponding distorted circular shapes facilitate placement of the first bore and the second bore around the outer diameters of the corresponding mating members.

7. The link of claim 1, wherein the material applies tension to the first portion and the second portion to expand the first bore and the second bore.

8. A master link, comprising:
a first portion that abuts a first face of the master link;
a second portion that abuts a second face of the master link;
a first bore located on a first end of the master link; and
a second bore located on a second end of the master link,
wherein corresponding shapes of the first bore and the second bore facilitate securing of the first bore and the second bore to corresponding mating members of a track chain without use of a set of fasteners,
wherein a separation is located between the first portion and the second portion and extends between the first bore and the second bore,
wherein the separation is expandable to facilitate insertion of a material between the first portion and the second portion and to facilitate placement of the first bore and the second bore around outer diameters of the corresponding mating members.

9. The master link of claim 8, wherein the master link is mechanically secured to a plurality of ground engaging plates of the track chain without the use of the set of fasteners.

10. The master link of claim 8, wherein the separation is formed by electro-discharge machining (EDM) after the master link has been cast.

11. The master link of claim 8, wherein the corresponding shapes of the first bore and the second bore are circular to match corresponding shapes of the outer diameters of the corresponding mating members.

12. The master link of claim 8, wherein the corresponding shapes facilitate compression of the first bore and the second bore around the outer diameters of the mating members.

13. The master link of claim 8, further comprising:
a hole that extends through the first face and the first portion and not into the second portion,
wherein the hole is associated with securing a ground engaging plate to the first face and not with securing the first bore and the second bore to the corresponding mating members.

14. The master link of claim 8, wherein a width of the separation facilitates securing of the first bore and the second bore to the corresponding mating members.

15. A method, comprising:
forming, by one or more machines of a factory, a link for a track chain,
wherein the link has a first surface and a second surface that abut a third surface and a fourth surface,
wherein the link has a first bore and a second bore that extend through the third surface and the fourth surface,
wherein the first bore is located at a first end of the link and the second bore is located at a second end of the link;
forming, by the one or more machines of the factory and in association with forming the link, a separation in the link that extends from the first bore to the second bore,
wherein the separation creates a first portion of the link that abuts the first surface and a second portion of the link that abuts the second surface,
wherein a width of the separation facilitates securing of the first bore and the second bore to corresponding mating members of the track chain;
applying, by the one or more machines of the factory and after forming the separation, a mechanical force to expand the separation to facilitate insertion of a material within the separation and between the first portion and the second portion, wherein the material is associated with maintaining expansion of the separation to facilitate placement of the first bore and the second bore around outer diameters of the corresponding mating members;

inserting, by the one or more machines of the factory and after expanding the separation, the material between the first portion and the second portion; and releasing, by the one or more machines of the factory and after inserting the material, the link from application of the mechanical force that is expanding the separation.

16. The method of claim 15, wherein forming the separation comprises:

forming the separation using electro-discharge machining (EDM), or forming the separation during casting of the link.

17. The method of claim 15, wherein inserting the material comprises:

inserting a wedge of the material into the separation between the first portion and the second portion, or flowing a molten form of the material into the separation between the first portion and the second portion.

18. The method of claim 15, wherein applying the mechanical force to expand the separation comprises:

expanding the separation to a width that facilitates placement of the first bore and the second bore around the outer diameters of the corresponding mating members of the track chain; and wherein inserting the material comprises:

inserting the material to maintain the width of the separation.

19. The method of claim 15, further comprising:

installing, after releasing the first portion and the second portion, the link on the track chain by:

placing the first bore and the second bore around the outer diameters of the corresponding mating members, and removing the material from between the first portion and the second portion.

20. The method of claim 19, wherein removing the material comprises:

removing the material by:

melting the material,
wherein the material has a melting temperature that is less than a material of the link, or applying a mechanical force to the material perpendicular to the third surface and the fourth surface.

* * * * *